Patented Feb. 4, 1930

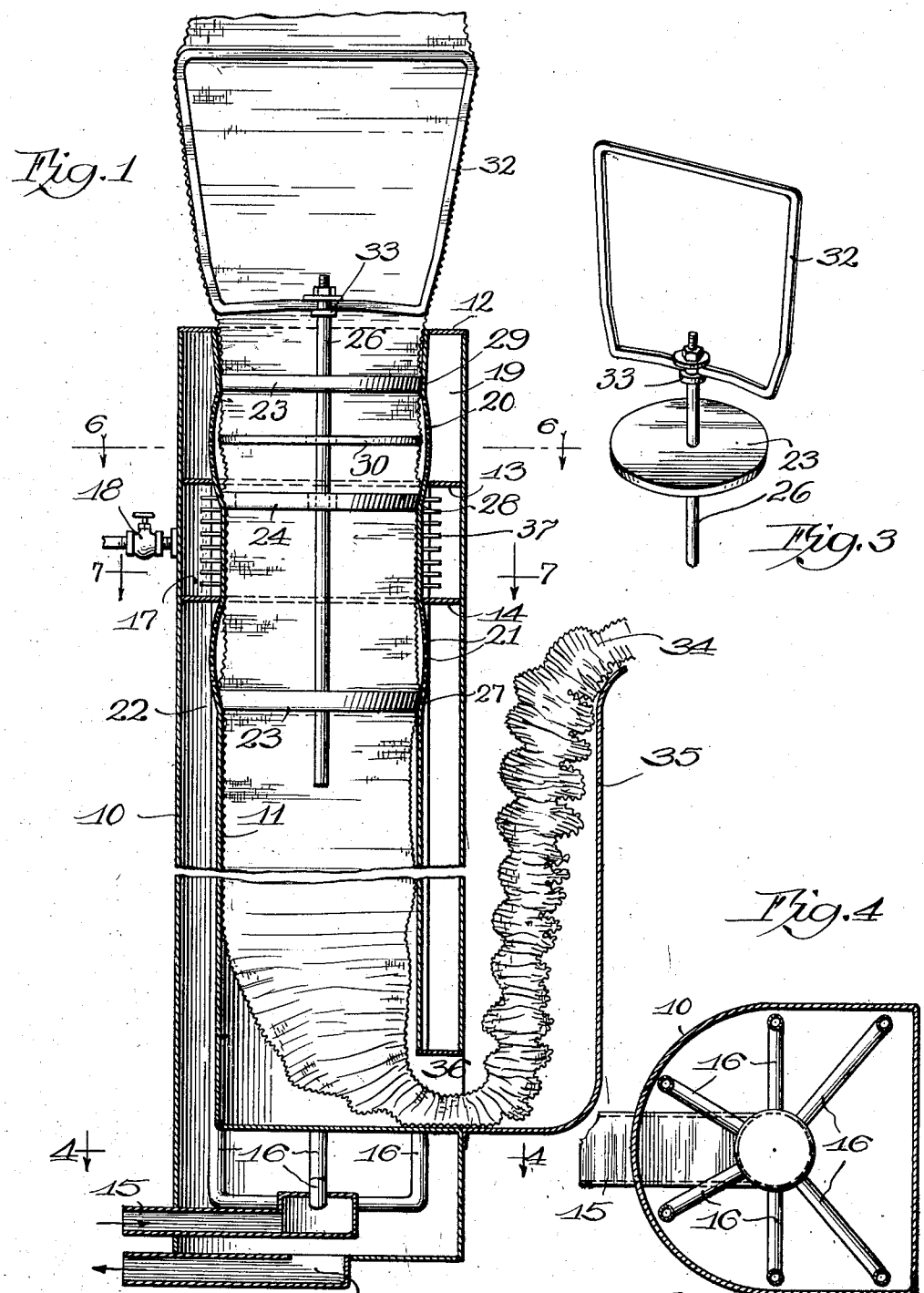

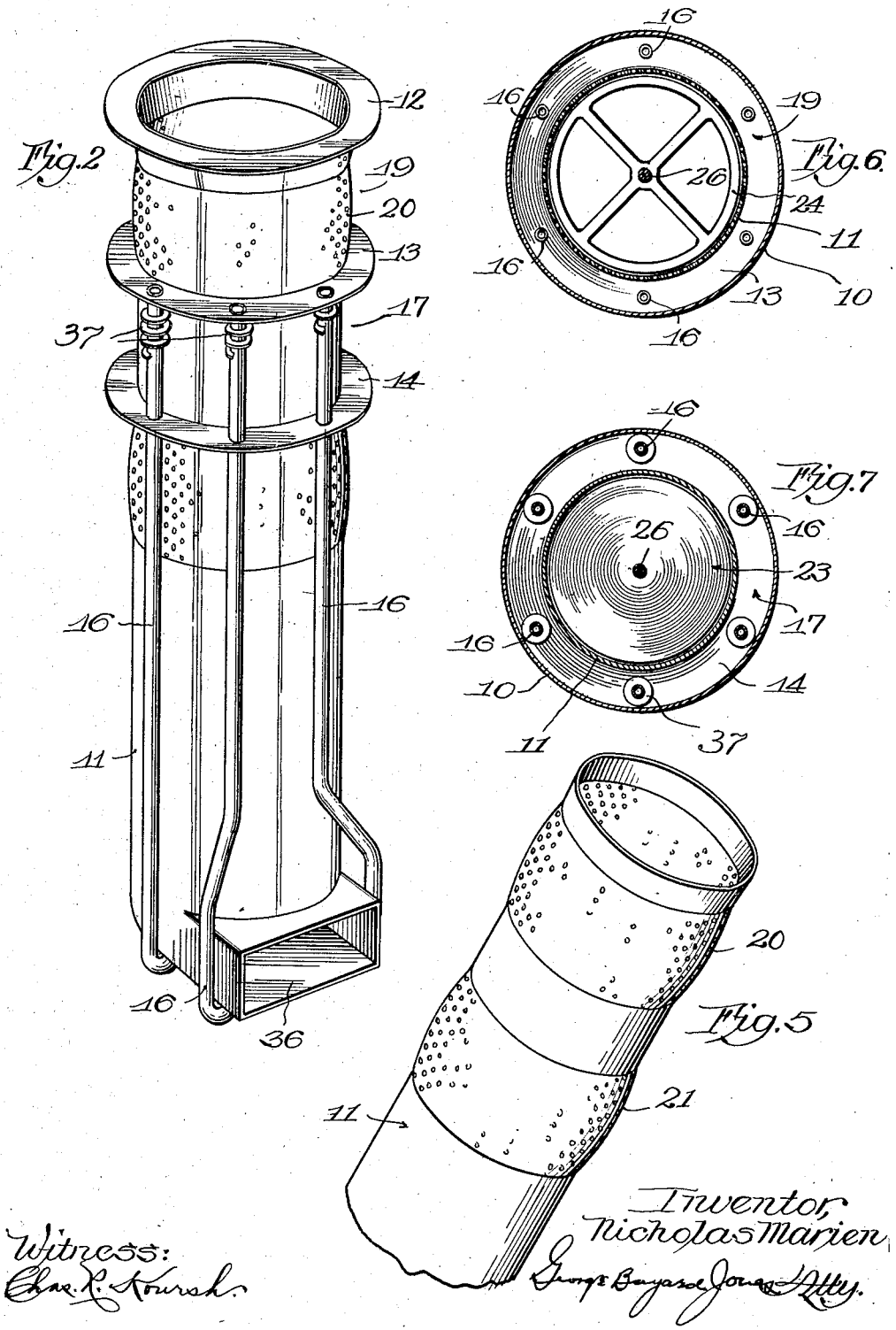

1,745,499

UNITED STATES PATENT OFFICE

NICHOLAS MARIEN, OF CHICAGO, ILLINOIS

DRIER FOR TUBULAR FABRICS

Application filed June 20, 1928, Serial No. 286,949. Renewed October 29, 1929.

My invention relates to improvements in driers for tubular fabrics.

The object of my invention is to provide improved apparatus and method by means of which fabrics, more particularly tubular fabrics, may be quickly dried with an economical use of the heat available, and as a continuous operation.

In the accompanying drawings in which one embodiment of the invention is illustrated, Fig. 1 is a sectional elevation of the apparatus, Fig. 2 is a perspective view thereof with the outer casing removed, Fig. 3 is a perspective of a detail, Fig. 4 is a section on the line 4—4 of Fig. 1, Fig. 5 is a perspective view of the inner one of the two walls of the drier, Fig. 6 is a section on the line 6—6 of Fig. 1, and Fig. 7 is a section on the line 7—7 of Fig. 1.

The drier, in the form shown, comprises in general a pair of tubular members, preferably cylindrical, one surrounding the other and spaced therefrom by a series of circular partitions providing a plurality of chambers. The fabric to be dried is drawn through the hollow tubular member thus formed, being held against the inner surface of said tubular member, or near the same, by suitable means such as a frame which may consist of several circular members of such configuration as to provide a slight clearance between themselves and the inner wall of the tubular member as the fabric is being drawn through the latter. Heated air passes inwardly through the fabric from one of said chambers along the inside of the fabric tube and outwardly through the fabric into another of said chambers, the inner cylindrical wall being perforated to permit such flow.

Describing the apparatus more in detail, 10 is the outer casing, which in this instance is made cylindrical except at the bottom, and 11 is the inner wall spaced therefrom by a series of partitions 12, 13 and 14, having the form of flat rings. Air is supplied at the bottom through an inlet pipe 15, and branches out through a series of vertical pipes 16, spaced preferably uniformly in the circular clearance space between the outer and inner walls. These pipes terminate at the partition 13 as shown particularly in Fig. 2.

The chamber between the partitions 13 and 14 through which the upper ends of the pipes 16 pass, is a steam chamber 17, to which steam is admitted from any suitable source of supply and controlled by valve 18. The incoming air passes into the annular chamber 19, being preheated first in chamber 22 as hereinafter described and being further heated in its passage through the pipes in chamber 17. The inner wall 11 is not exactly cylindrical but varies somewhat in diameter at different points as shown in the perspective view in Fig. 5, and has two zones, one above the other, each of which is perforated. The upper zone, comprising the inner wall of the chamber 19, has a series of small openings 20 therein, and the lower zone has a series of small openings 21 therein located in that part of the wall comprising the inner boundary of the chamber 22. These three chambers 19, 17 and 22, it will be understood, are all shut off from each other by the partitions 13 and 14.

Within the more or less cylindrical chamber just described, I provide means over which the fabric may pass preferably in an upwardly direction, in drawing it through the drier. Three circular members are provided 23, 24 and 25 on a vertical shaft 26, the bottom one of which is fixed to said shaft to prevent it from dropping off and the other two of which may either be fixed to or loose on said shaft. The lower member 23 is preferably an imperforate disc, the member 24 has openings therethrough being preferably in the form of a spider and the upper member 25 is also an imperforate disc. Each of said members is of slightly less diameter than the one above it and is preferably bevelled to fit against the correspondingly tapered surface of the inner wall 11, and thus said members seat themselves on said wall at 27, 28 and 29, except when fabric is being drawn between the bevelled inner members and the surrounding outer member. The movement of the fabric tube through the drier being upwardly in this instance, said inner members tend to seat themselves by gravity alone.

An additional light ring 30 may also be mounted on the rod 26 having a diameter only slightly less than the diameter of the corresponding part of the inner member 11 so that as the fabric is drawn upwardly over the frame formed by the four circular members just described, said fabric is held smoothly adjacent the inner wall 11 against the tendency of the air to blow it inwardly and cause it to collapse or wrinkle. Its weight also tends to hold it open.

The circuit of the heated air will now be apparent. It flows inwardly from the chamber 19, through the openings 20 and through the fabric held against the same and then downwardly through the spider 24 and outwardly through the fabric and through the openings 21 into the chamber 22 through which the pipes pass bearing the incoming air. This heated exhaust air, therefore, gives up part of its heat to the incoming air to preheat the same before it reaches the steam chamber 17, and thus a substantial heat economy is effected. From the chamber 22 the air is drawn off through the outlet 31 by any suitable mechanism.

The flow of air through the apparatus may be caused by a blower producing a suction in the exhaust 31 or by a blower producing pressure in the inlet 15 or preferably by both.

On the upper end of the rod 26 I mount a frame 32, which is removably clamped against a shoulder 33 on said rod and which may rotate thereon. This frame serves the purpose of flattening out the tubular fabric before it is wound onto a roll, (not shown) located closely adjacent thereto. The fabric has a longitudinal seam, and it is desirable that this seam always maintain, more or less, the same position with reference to the two folds when the fabric is flat. With my present arrangement of spiders and discs, it is very easy for the operator watching the seam as the fabric issues, to take hold of the fabric and rotate it one way or another to maintain the seam in its proper position. In turning the fabric the discs turn with it, the bottom disc being fixed to the vertical shaft and the upper discs being preferably rotatable thereon, but all turning together, due to the friction of the fabric therewith.

The fabric itself, preferably in tubular form 34, is fed into the drier over a sheet metal guide 35 and through an opening 36 in the side wall, preferably to a point below the floor level, then upwardly for a distance of a good many feet, to enable it to hang freely from the frame over which it passes. The frame may be readily removed in order to insert it in the tubular fabric when the end of it is being drawn through the drier initially. As the fabric is drawn upwardly between the four circular members and the corresponding seats therefor, a fairly sung joint is maintained at the top and bottom which prevents any great leakage of air.

To facilitate the exchange of heat, the pipes 16 may have copper fins 37 thereon, of any suitable configuration, or other heat conducting fins to accelerate the operation.

An important feature of the invention is that the operation is continuous, the rear end of one length of tubular fabric being secured to the forward end of the next one and so on. This continuous operation with a tubular fabric held in open position is made possible by the introduction of the air from the outside to the inside of the fabric. Also, the discharge of heated air is controlled, whereby it is not necessarily discharged into the room as in certain prior installations. The drying air is used very effectively in that it passes through the fabric twice, thereby taking up the maximum amount of moisture before being discharged.

Another advantage of my apparatus is that the entire equipment is a self contained unit in that it does not require a separate heating element at a distance as in certain prior installations.

In the preferred arrangement shown herein, the moist fabric meets first a stream of air having considerable moisture therein and after advancing a little is given the final and more complete drying by a current of dry air. Although this appears to be the most efficient method with the apparatus in question, the reverse arrangement may, under some conditions, be employed. Furthermore, with proper temperature and humidity conditions, the air may be used without heating the same. Various other changes in the method and apparatus may be made within the scope of the invention.

What I claim is:

1. Means for drying fabrics, comprising a tubular member having circumferential openings, a frame in said member of a size somewhat smaller than the same, whereby the fabric may be drawn between said frame and the inner wall of said member, and means for causing air to flow through said openings and hence through the adjacent fabric, to dry the latter.

2. Means for drying fabrics, comprising a tubular member having two zones of circumferential openings, a frame in said member a size somewhat smaller than the same, whereby the fabric may be drawn between said frame and the inner wall of said member, and means for causing air to flow inwardly through one set of openings, and outwardly through the other, passing through said fabric in both cases.

3. Means for drying fabrics, comprising a tubular structure having hollow walls with partitions providing a plurality of chambers, means for admitting steam to one of said chambers, air pipes passing through said steam chamber to another of said chambers, the inner wall of the latter being perforated, and means for causing air to flow through said pipes and perforations.

4. Means for drying fabrics, comprising a tubular structure having hollow walls with partitions providing a plurality of chambers, means for admitting steam to one of said chambers, air pipes passing through said steam chamber to another of said chambers, the inner wall of the latter being perforated, means for causing air to flow through said pipes and perforations, and a frame in said tubular structure over which said fabric may be drawn.

5. Means for drying fabrics, comprising a tubular structure having hollow walls with partitions providing a plurality of chambers, means for admitting steam to one of said chambers, air pipes passing through said steam chamber to another of said chambers, the inner wall of the latter being perforated, means for causing air to flow through said pipes and perforations, and a frame in said tubular structure comprising a plurality of transverse elements normally seating against the inner wall thereof, but adapted to be lifted as the fabric is drawn over said elements.

6. Apparatus for drying fabrics, comprising a tubular structure having hollow walls comprising three chambers, pipes passing through the first and second chambers for delivering air into the third chamber, means for admitting steam into the middle chamber to heat the incoming air, the inner wall of said first and third chamber being perforated whereby the air may flow from said third chamber to the interior of said tubular member, and thence outwardly to the said first chamber, whereby it may deliver part of its heat to the incoming air in the pipes passing therethrough.

7. Apparatus for drying fabrics, comprising a tubular chamber with hollow side walls, a plurality of transverse members normally seated on said side walls, means connecting said transverse members whereby they may be removed from said chamber, and means for supplying heated air through said hollow walls to the interior of said chamber.

8. Apparatus for drying tubular fabrics, comprising hollow tubular side walls having an opening at the bottom, said hollow walls containing partitions providing three chambers, means for exhausting air from the lowermost chamber, pipes passing vertically therethrough, and also through the second chamber, means for admitting steam to said second chamber whereby air flowing through said pipes into said third chamber may be heated, the inner wall of said third chamber having openings whereby the heated air may flow radially inward and thence outwardly into and through said first chamber through perforations in the walls thereof.

9. In equipment for drying tubular fabrics, a longitudinal member, a series of disks thereon, the intermediate disks having openings therethrough, a wall of circular cross section surrounding said disks, the latter being tapered at the peripheries, and resting on correspondingly shaped seats formed in said wall whereby all of said disks may be withdrawn in one direction.

10. Means for drying fabrics, comprising a vertical tubular wall having an opening at the bottom, an inner wall spaced therefrom, inlet and exhaust openings at the bottom of said walls, the inner wall having a series of inclined circumferential seats, a circular member resting on each seat, a vertical rod passing centrally through each of said members, and a frame removably secured to the top of said rod.

11. In equipment for drying tubular fabrics, a heater having an opening therethrough with a shoulder in said opening, means detached from said heater whereby it may be inserted in the fabric tube being drawn through said opening to thereby extend said fabric and tending to slide downwardly through said tube by gravity, but having its movement limited by said shoulder and means for passing air from said heater into said extended fabric tube.

12. Apparatus for continuously drying a tube of fabric comprising a hollow structure through which said fabric is drawn, the inner wall of said structure having two groups of openings spaced apart longitudinally and means for causing air to flow through one group of openings into said fabric through the wall thereof and subsequently from the inside of said fabric to the outside, through said second group of openings, whereby the maximum moisture content is removed from said fabric.

13. The method of effecting a continuous drying of a fabric tube which consists in maintaining the tube in extended condition from within and intermediate its ends, causing the extended portion to travel longitudinally of the tube and passing air through the fabric from without.

14. The method of effecting a continuous drying of a fabric tube which consists in maintaining the tube in extended condition from within, causing the extended portion to travel longitudinally of the tube and passing air through the said extended portion from the outside in and then from the inside out, to remove the moisture therefrom.

15. The method of drying a fabric tube which consists in maintaining the tube in extended condition from within and intermediate its ends, causing the extended portion to travel longitudinally of said tube, and passing air continuously through the fabric first in one direction and then in the other.

16. The method of effecting a continuous drying of a fabric tube which consists in lifting said tube while maintaining it in extended condition from within by permitting separate detached means to descend in it by gravity, limiting the downward movement of said means by restricting said tube from without, passing warm air through the extended fabric from the outside to the inside thereof, and subsequently repassing said air through said fabric to the outside thereof at a lower zone, whereby the second passage of air removes the initial moisture and as the tube passes upwardly the dryer incoming air effects the final drying operation.

In testimony whereof, I have subscribed my name.

NICHOLAS MARIEN.